United States Patent
Nagamitsu

(10) Patent No.: US 12,093,677 B2
(45) Date of Patent: Sep. 17, 2024

(54) OTA MASTER, UPDATE CONTROL METHOD, AND NON-TRANSITORY STORAGE MEDIUM

(71) Applicant: TOYOTA JIDOSHA KABUSHIKI KAISHA, Toyota (JP)

(72) Inventor: Shoichi Nagamitsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 319 days.

(21) Appl. No.: 17/713,632

(22) Filed: Apr. 5, 2022

(65) Prior Publication Data

US 2022/0365766 A1  Nov. 17, 2022

(30) Foreign Application Priority Data

May 13, 2021  (JP) ................. 2021-081844

(51) Int. Cl.

| G06F 8/65 | (2018.01) |
| B60W 50/00 | (2006.01) |
| B60W 50/02 | (2012.01) |
| G06F 9/445 | (2018.01) |
| H04L 9/32 | (2006.01) |
| H04L 29/08 | (2006.01) |

(52) U.S. Cl.
CPC .............. G06F 8/65 (2013.01); B60W 50/00 (2013.01); *B60W 2050/0083* (2013.01); *B60W 2556/45* (2020.02)

(58) Field of Classification Search
CPC ... G06F 8/65; G06F 21/51; G06F 8/71; G06F 21/57; G06F 21/572; G06F 8/311; G06F 8/654; B60W 50/00; B60W 2556/45; B60W 2050/0083; H04L 67/34; H04L 67/12

See application file for complete search history.

(56) References Cited

U.S. PATENT DOCUMENTS

| 11,163,549 B2 * | 11/2021 | Sakurai .................... G06F 8/65 |
| 2005/0256614 A1 * | 11/2005 | Habermas ............. B60L 3/0023 701/1 |
| 2017/0199633 A1 * | 7/2017 | Forstall .................. G06F 9/451 |
| 2022/0148344 A1 | 5/2022 | Teraoka et al. |

FOREIGN PATENT DOCUMENTS

| JP | 2004-326689 A | 11/2004 |
| JP | 2020-004245 A | 1/2020 |
| JP | 2020-166583 A | 10/2020 |

* cited by examiner

*Primary Examiner* — Thuy Dao

(74) *Attorney, Agent, or Firm* — Oliff PLC

(57) ABSTRACT

An OTA master configured to update one or more software on in-vehicle device includes one or more processors. The OTA master is configured to connect to an in-vehicle network including the in-vehicle device and communicate with an OTA center over a network. The one or more processors are configured to, out of software groups each composed of a combination of the software of the in-vehicle device, acquire configuration information on the software group in which a change has occurred in a configuration of the combination of the software. The one or more processors are configured to send the acquired configuration information to the OTA center.

5 Claims, 10 Drawing Sheets

| SWID | CONFIGURATION INFORMATION |
|---|---|
| AUTONOMOUS DRIVING FUNCTION Ver 2.0 | xxxxxxx |
| MULTIMEDIA FUNCTION Ver 1.0 | xxxxxxx |
| AUTOMATIC PARKING FUNCTION Ver 1.0 | xxxxxxx |

161 162

| CONSTITUENT ECU | Ver INFORMATION |
|---|---|
| ACCELERATOR ECU | Ver 2.0 |
| BRAKE ECU | Ver 2.0 |
| STEERING WHEEL ECU | Ver 2.0 |

| SWID | CHECK HASH VALUE |
|---|---|
| AAA FUNCTION Ver 1.0 | xxxxxxxxxx |
| BBB FUNCTION Ver 1.0 | xxxxxxxxxx |
| CCC FUNCTION Ver 1.0 | xxxxxxxxxx |

171 172

OTA MASTER, UPDATE CONTROL METHOD, AND NON-TRANSITORY STORAGE MEDIUM

CROSS-REFERENCE TO RELATED APPLICATION

This application claims priority to Japanese Patent Application No. 2021-081844 filed on May 13, 2021, incorporated herein by reference in its entirety.

BACKGROUND

1. Technical Field

The present disclosure relates to over-the-air (OTA) masters update control methods, and non-transitory storage media for updating software on an in-vehicle device.

2. Description of Related Art

Vehicles are equipped with a plurality of electronic control units ("ECUs") for performing control functions. Each ECU includes a processor and a storage unit. The control functions of each ECU are implemented by the processor executing software stored in the storage unit. The software stored in each ECU can be updated. Specifically, the software can be updated in a maintenance shop etc. by using external equipment connected via a diagnostic connector provided in the vehicle. Communication equipment provided in an in-vehicle network and a communication network such as the Internet may be connected wirelessly to update the software with software downloaded from a distribution server provided in an update center through wireless communication (for example, Japanese Unexamined Patent Application Publication No. 2020-004245 (JP 2020-004245 A)). This update service through wireless communication is referred to as the "OTA service."

SUMMARY

In the update process in the OTA service, data on all ECUs mounted on a predetermined vehicle is sent from the vehicle to the center in order to grasp the current software configuration of the vehicle before starting the update for the vehicle. The center determines the necessity of the update etc. based on the data.

In recent years, however, the number of ECUs included in vehicles has been increasing with an increase in number of functions in the vehicles. For example, the number of ECUs installed in the vehicles may be as large as about 50. Therefore, the amount of data communication increases if data on all the ECUs is sent to the center every time. Moreover, the load of the check process on the center is not small.

The present disclosure provides an OTA master, an update control method, and a non-transitory storage media capable of updating ECU software without sending data on all ECUs installed on a vehicle.

In a first aspect of a technique of the present disclosure, an OTA master configured to update one or more software on in-vehicle device includes one or more processors. The OTA master is configured to connect to an in-vehicle network including the in-vehicle device and communicate with an OTA center over a network. The one or more processors are configured to, out of software groups each composed of a combination of the software of the in-vehicle device, acquire configuration information on a software group in which a change has occurred in a configuration of the combination of the software. The one or more processors are configured to send the acquired configuration information to the OTA center.

In the OTA master according to the first aspect of the technique of the present disclosure, the one or more processors may be configured to determine whether the change has occurred in the configuration of the combination of the software before and after a predetermined timing. The one or more processors may be configured to, when the change has occurred, acquire the configuration information on the software group in which the change has occurred.

In the OTA master according to the first aspect of the technique of the present disclosure, the one or more processors may be configured to receive, from the OTA center, a center command including a command to send configuration information on a predetermined software group. The one or more processors may be configured to acquire, when the one or more processors received the center command, the configuration information on the software group in which the change has occurred in the configuration of the combination of the software.

In the OTA master according to the first aspect of the technique of the present disclosure, the center command may include a command to send the configuration information on the software group in which the change has occurred in the configuration of the combination of the software.

In a second aspect of the technique of the present disclosure, an update control method is performed by a computer of an OTA master configured to communicate with an OTA center over a network. The OTA master includes one or more processors and a memory. The update control method includes: out of software groups each composed of a combination of software of an in-vehicle device, acquiring configuration information on a software group in which a change has occurred in a configuration of the combination of the software; and sending the acquired configuration information to the OTA center.

In a third aspect of the technique of the present disclosure, a non-transitory storage medium stores instructions that are executable by one or more computers of an OTA master and that cause the one or more computers to perform functions. The OTA master includes one or more processors and a memory. The OTA master is configured to communicate with an OTA center over a network. The functions include: out of software groups each composed of a combination of software of an in-vehicle device, acquiring configuration information on a software group in which a change has occurred in a configuration of the combination of the software, and sending the acquired configuration information to the OTA center.

According to the OTA master, the update control method, and the non-transitory storage medium of the present disclosure, the amount of data communication in the update process can be reduced, and the time required to complete the update can be reduced.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 10 illustrates an example of a data configuration of installed SWID definition data 152;

FIG. 11 illustrates an example of a data configuration of a check SWID hash value 153;

DETAILED DESCRIPTION OF EMBODIMENTS

Figure 1:
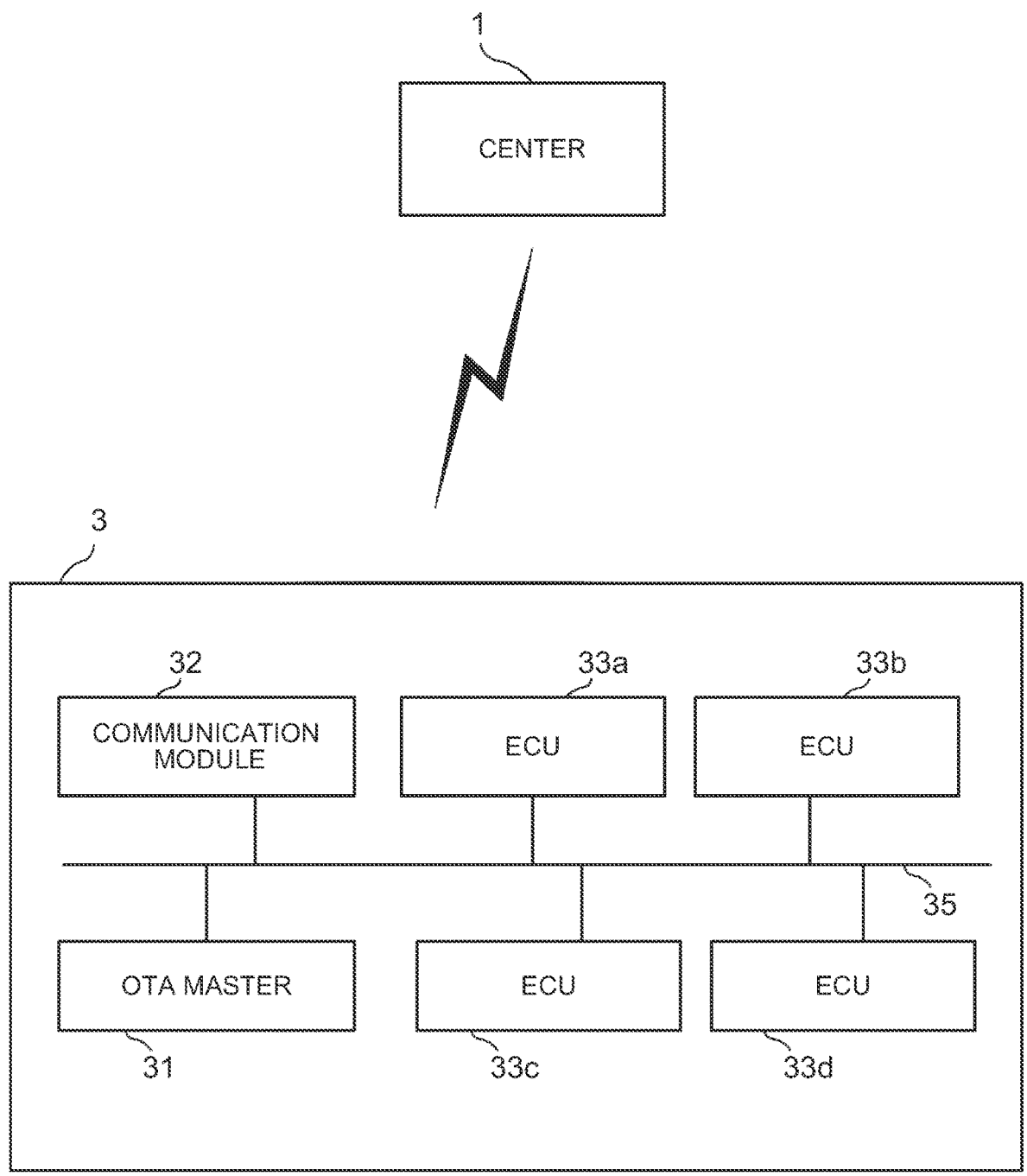
FIG. 1 is a block diagram illustrating an overall configuration of a system according to an embodiment.

An embodiment of a technique of the present disclosure will be described in detail with reference to the drawings.

When performing an update process of updating software on an in-vehicle electronic control unit (hereinafter referred to as the "ECU software") in an OTA service, data on all pieces of ECU software installed in a vehicle is sent to an OTA center (hereinafter simply referred to as the "center"). Specifically, serial numbers of all the pieces of ECU software (numbers identifying each piece of software) and a hash value based on the versions of the pieces of software (hereinafter referred to as the "total hash value") are generated and sent to the center. In the present embodiment, on the other hand, configuration information on a part of pieces of ECU software rather than all the pieces of ECU software, specifically a hash value of the part of pieces of ECU software, is generated and sent to the center. The necessity of an update process for a predetermined piece of ECU software is determined based on this hash value. The update process is performed if the update process is determined to be necessary. In the present embodiment, the time required to complete the update process can be reduced while reducing the amount of communication, as compared to the case of using the total hash value. More specifically, the hash value of a part of the pieces of ECU software is generated and sent using a "software identification (ID)," and the necessity of the update process is determined.

The software ID (hereinafter referred to as SWID) will be described. The SWID indicates a group of pieces of ECU software grouped by a predetermined function that is implemented by a combination of functions of a plurality of ECUs. In other words, the SWID indicates the configuration of software for implementing a certain function. For example, it is herein assumed that there is a function called "autonomous driving function." It is also assumed that the "autonomous driving function" is implemented by the following three pieces of ECU software cooperating with each other: ECU software that controls a steering wheel (hereinafter referred to as the "steering wheel ECU"), ECU software that controls an accelerator (hereinafter referred to as the "accelerator ECU"), and ECU software that controls a brake (hereinafter referred to as the "brake ECU"). In this case, as an example of the SWID, "autonomous driving function Ver 1.0" or "autonomous driving function Ver 2.0" is defined. The SWID defines a combination of pieces of ECU software in consideration of the versions of the pieces of ECU software. In the above example, "autonomous driving function Ver 1.0" indicates a combination of "steering wheel ECU Ver 1.0," "accelerator ECU Ver 1.0," and "brake ECU Ver 1.0." Moreover, "autonomous driving function Ver 2.0" indicates a combination of "steering wheel ECU Ver 2.0," "accelerator ECU Ver 2.0," and "brake ECU Ver 2.0."

In the present embodiment, a hash value is generated for each SWID. For example, a hash value is generated based on the serial numbers and version numbers of the pieces of ECU software (hereinafter referred to as constituent ECUs) defined as "autonomous driving function Ver 1.0." It can be said that the hash value is so-called configuration information indicating the software configuration of the pieces of ECU software of the SWID. The hash value is sent from the OTA master to the center. The center compares a hash value corresponding to "autonomous driving function Ver 1.0" that is stored in the center itself or that can be calculated by itself with the hash value sent from the OTA master. The necessity of the update process for any constituent ECU of the SWID is determined based on the comparison result. More specifically, when the hash values match, it is determined that an update is not necessary, and when the hash value do not match, it is determined that an update is necessary.

First Embodiment

Hereinafter, an application example of such a process using the SWID as described above will be described. The following case will be considered in a first embodiment. In the first embodiment, it is assumed that the combination of the versions of the pieces of ECU software defined as a certain SWID and the actual combination of the versions of the pieces of ECU software do not match due to replacement of a predetermined ECU. Specifically, it is assumed that, for a vehicle equipped with "autonomous driving function Ver 2.0," the version of the accelerator ECU has changed from "Ver 2.0" to "Ver 1.0" as a result of replacement of an ECU for controlling an accelerator. In this case, regarding the combination of the versions of the pieces of ECU software defined as "autonomous driving function Ver 2.0," the versions of the accelerator ECU, the steering wheel ECU, and the brake ECU should all be "Ver 2.0." However, the actual combination of the versions of the accelerator ECU, the steering wheel ECU, and the brake ECU is different from this combination due to the replacement of the ECU (hereinafter, this state is sometimes referred to as the "mismatch state"). It is considered undesirable to operate the vehicle in such a state. It is therefore necessary to update (upgrade) the accelerator ECU from "Ver 1.0" to "Ver 2.0."

In the first embodiment, the SWID whose configuration has changed is detected when such a mismatch state occurs. A hash value for the SWID whose configuration has changed (hereinafter referred to as "SWID hash value") is generated. In the above example, the accelerator ECU that is a constituent ECU of "autonomous driving function Ver 2.0" has changed. Accordingly, an SWID hash value is generated based on the versions of the "steering wheel ECU," the "accelerator ECU," and the "brake ECU" at the time a change occurred in the accelerator ECU. That is, an SWID hash value is generated based on "steering wheel ECU Ver 2.0," "accelerator ECU Ver 1.0" (the version has changed due to the replacement), and "brake ECU Ver 2.0." The SWID hash value is sent to the center, and the center determines the necessity of an update. A process of performing an update process for the accelerator ECU when the update is necessary is performed. Hereinafter, the first embodiment will be described in more detail.

Overall Configuration of System of First Embodiment

FIG. 1 is a block diagram showing an overall configuration of an update control system according to the first embodiment. The update control system includes a center 1 and a vehicle 3.

The center 1 is a server that manages an update of software on an in-vehicle device in the vehicle 3 (to be more exact, the center 1 is a center system including such a server, but will be described as a server for convenience of description). The center 1 can communicate with the vehicle 3 (OTA master 31).

The vehicle 3 is equipped with an in-vehicle network system (not shown). The in-vehicle network system can communicate with the center 1. The in-vehicle network system includes at least the OTA master (software update device) 31, a communication module 32, and a plurality of electronic control units (ECUs) 33a to 33d.

The OTA master 31 is connected to the communication module 32 and the ECUs 33a to 33d via a bus 35. The OTA master 31 can wirelessly communicate with the center 1 via the communication module 32. The OTA master 31 controls a software update process for each ECU 33a to 33d while sending and receiving predetermined data to and from the center 1. That is, the OTA master 31 has a software update function. The communication module 32 is communication equipment connected to a predetermined network (telephone network, Internet network, etc.). One of the ECUs 33a to 33d may function as the OTA master 31.

The ECUs 33a to 33d control the operation of various parts of the vehicle 3. It should be understood that the number of ECUs 33a to 33d in FIG. 1 is by way of example.

Configuration of Center 1

Figure 2:
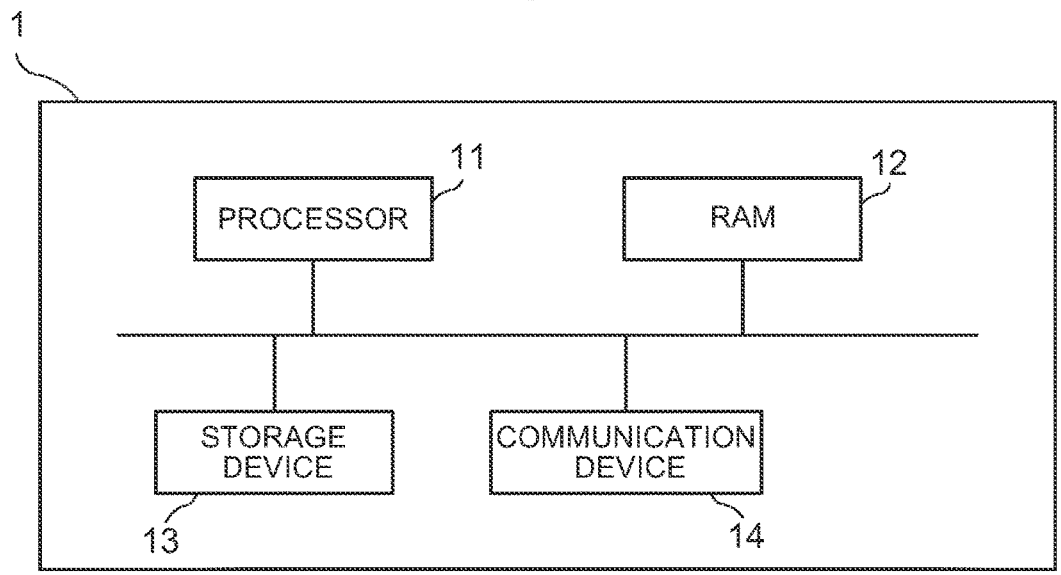
FIG. 2 is a block diagram illustrating a schematic configuration of a center 1.

FIG. 2 is a block diagram showing a schematic configuration of the center 1. As illustrated in FIG. 2, the center 1 includes a processor 11, a random access memory (RAM) 12, a storage device 13, and a communication device 14. The storage device 13 includes a readable and writable storage medium such as a hard disk drive (HDD) or a solid state drive (SSD). The storage device 13 stores various kinds of programs and data necessary for processes according to the present embodiment. The processor 11 performs a predetermined control process by executing programs read from the storage device 13 by using the RAM 12 as a work area. The communication device 14 communicates with the vehicle 3 over the network.

Configuration of OTA Master 31

Figure 3:
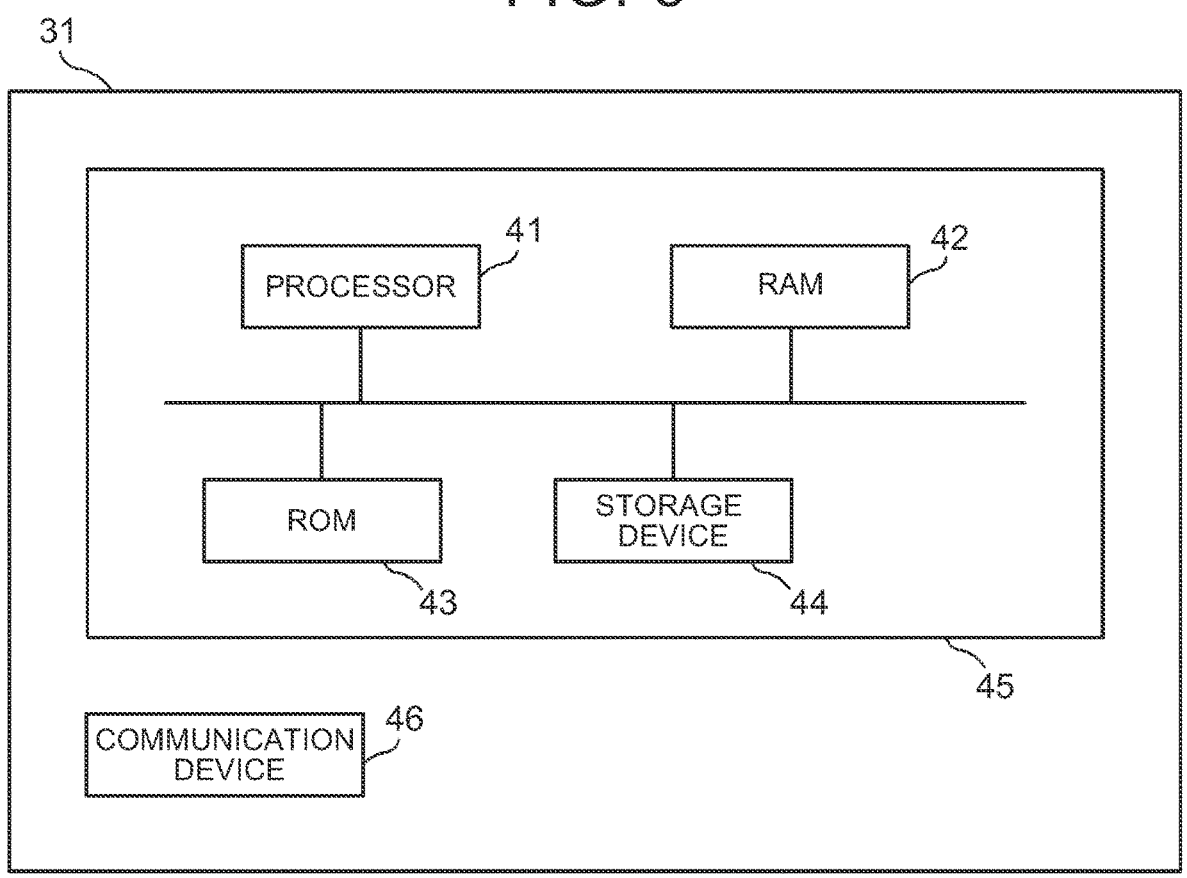
FIG. 3 is a block diagram illustrating a schematic configuration of an OTA master 31.

FIG. 3 is a block diagram showing a schematic configuration of the OTA master 31. As illustrated in FIG. 3, the OTA master 31 includes a microcomputer 45 and a communication device 46. The microcomputer 45 includes a processor 41, a RAM 42, a read-only memory (ROM) 43, and a storage device 44. In the OTA master 31, the processor 41 of the microcomputer 45 performs a predetermined control process by executing programs read from the ROM 43 by using the RAM 42 as a work area. The communication device 46 communicates with the communication module 32 and the ECUs 33a to 33d via the bus 35 shown in FIG. 1.

Functional Block Diagram of Center 1

Figure 4:
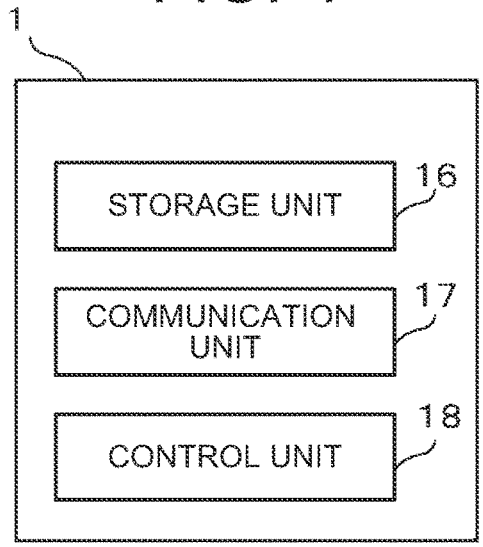
FIG. 4 is a functional block diagram of the center 1.

FIG. 4 is a functional block diagram of the center 1. The center 1 includes a storage unit 16, a communication unit 17, and a control unit 18. The communication unit 17 and the control unit 18 are implemented by the processor 11 shown in FIG. 2 executing programs stored in the storage device 13 by using the RAM 12. The storage unit 16 is implemented by the storage device 13 shown in FIG. 2.

The storage unit 16 stores programs and data to be used in the processes according to the present embodiment.

The control unit 18 sends and receives predetermined data to and from the OTA master 31 using the communication unit 17 and performs a software update process.

Functional Block Diagram of OTA Master 31

Figure 5:
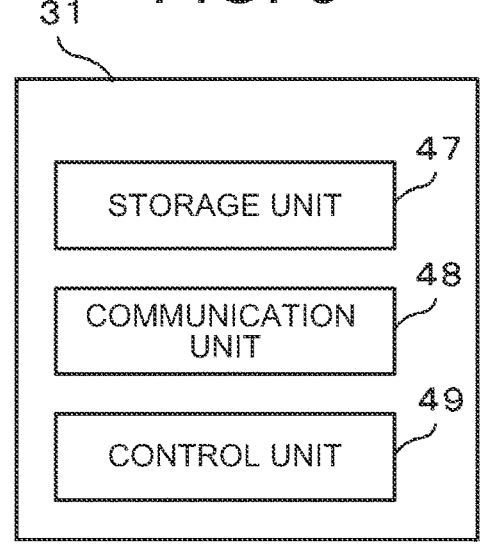
FIG. 5 is a functional block diagram of the OTA master 31.

FIG. 5 is a functional block diagram of the OTA master 31 shown in FIG. 3.

The OTA master 31 includes a storage unit 47, a communication unit 48, and a control unit 49. The storage unit 47 is implemented by the storage device 44 shown in FIG. 3. The communication unit 48 and the control unit 49 are implemented by the processor 41 shown in FIG. 3 executing programs stored in the ROM 43 by using the RAM 42.

The storage unit 47 stores various kinds of programs and data for execution of the software update process.

The control unit 49 communicates with the center 1 via the communication unit 48, and performs various controls related to the software update process. Specifically, the control unit 49 performs a process of detecting an occurrence of a change in the software configuration as illustrated above, a process of generating an SWID hash value when the change has occurred, and sending the SWID hash value to the center, and a process of updating predetermined ECU software as necessary. The communication unit 48 is an example of a "transmission unit".

Hereinafter, the processes according to the first embodiment will be described in detail.

Data for Use in Center 1

Figure 6:
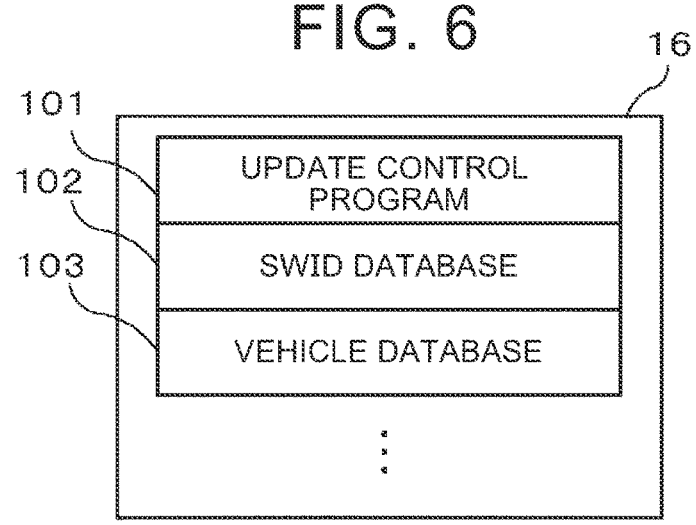
FIG. 6 illustrates a memory map showing an example of data stored in a storage unit 16 of the center 1.

First, data to be used in the processes of the center 1 will be described. FIG. 6 illustrates a memory map showing an example of data stored in the storage unit 16 of the center 1. An update control program 101, an SWID database 102, and a vehicle database 103 are stored in the storage unit 16. Although not shown in the figure, various kinds of programs and data for implementation of the OTA service may be also stored in the storage unit 16.

The update control program 101 is a program for controlling the software update process according to the present embodiment.

Figure 7:
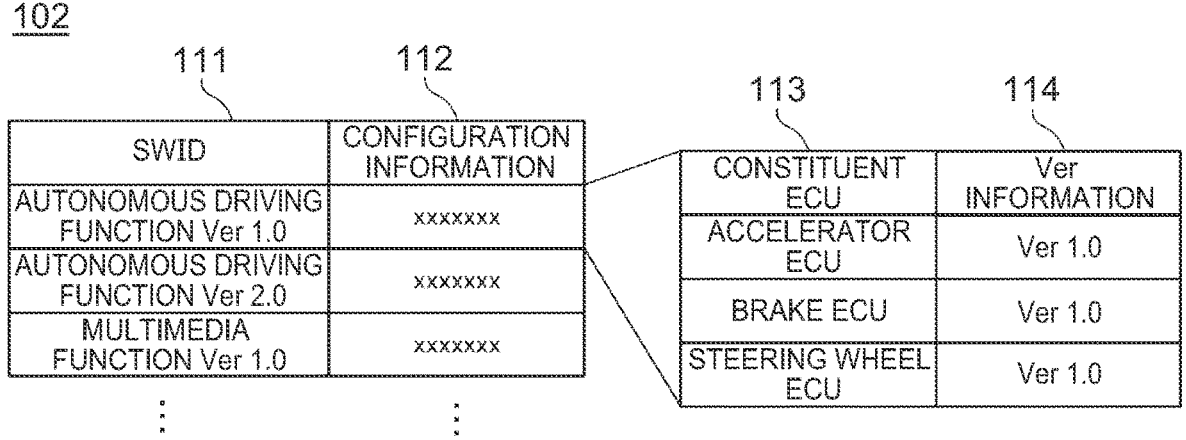
FIG. 7 illustrates an example of a data configuration of an SWID database 102.

The SWID database 102 is a database that defines the SWID. The SWID database 102 defines all SWIDs that can be installed in the vehicle. FIG. 7 shows an example of the data configuration of the SWID database 102. The SWID database 102 is a database including at least the following items: SWID 111 and configuration information 112. The item of the SWID 111 is data identifying the SWID, such as "autonomous driving function Ver 1.0" described above. The item of the configuration information 112 is data on constituent ECUs constituting the SWID (the function corresponding to the SWID). Specifically, the configuration information 112 is data in a table format including the following items: constituent ECU 113 and Ver information

114. The item of the constituent ECU 113 is data identifying the pieces of ECU software constituting the SWID. The item of the Ver information 114 is data indicating the version of each piece of ECU software. In the example of FIG. 7, the SWID 111 defines that "autonomous driving function Ver 1.0" is constituted by a combination of "accelerator ECU Ver 1.0," "brake ECU Ver 1.0," and "steering wheel ECU Ver 1.0."

Figure 8:
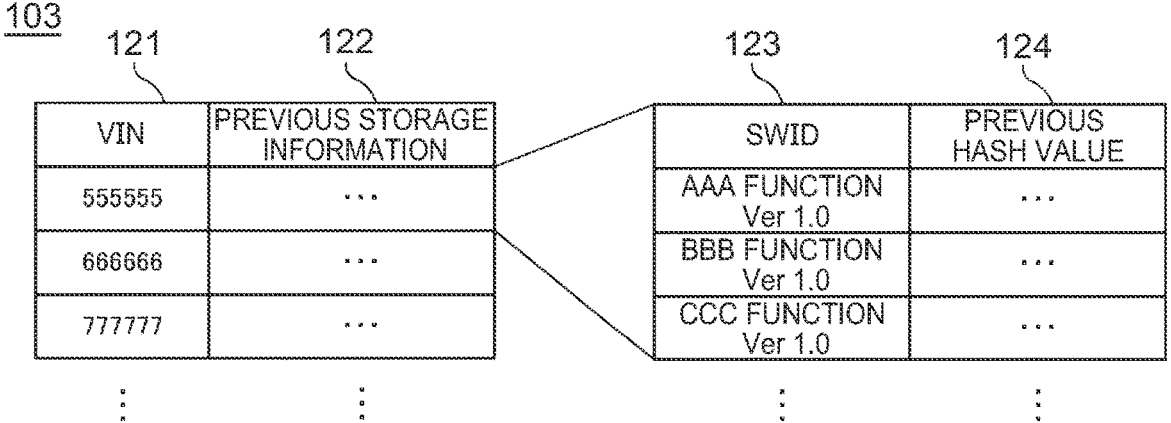
FIG. 8 illustrates an example of a data configuration of a vehicle database 103.

Referring back to FIG. 6, the vehicle database 103 is a database in which information on vehicles to which the OTA service is to be provided is registered. FIG. 8 shows an example of the data configuration of the vehicle database 103. The item of the vehicle database 103 is a database including at least the following items: vehicle identification number (VIN) 121 and previous storage information 122. The VIN 121 is a number uniquely identifying the vehicle. The previous storage information 122 is information on the SWID upon completion of the most recent update process for the vehicle shown in the VIN 121. Specifically, the previous storage information 122 is data in a table format including the following items: SWID 123 and previous hash value 124. The SWID 123 is data indicating the SWID installed in the vehicle (the function corresponding to the SWID installed in the vehicle). Therefore, the content may vary depending on the vehicle. The previous hash value 124 is an SWID hash value corresponding to the SWID. In the present embodiment, this value is the same value as the hash value calculated based on the information in the SWID database 102, but the hash value itself is stored in order to save the labor of the processing related to the calculation.

Data for Use in OTA Master 31

Figure 9:
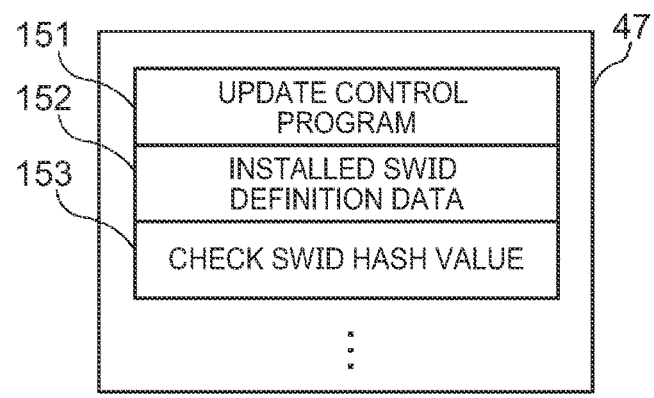
FIG. 9 illustrates a memory map showing an example of data stored in a storage unit 47 of the OTA master 31.

Next, data to be used in the OTA master 31 will be described. FIG. 9 illustrates a memory map showing an example of data stored in the storage unit 47 of the OTA master 31. At least an update control program 151, installed SWID definition data 152, and a check SWID hash value 153 are stored in the storage unit 47 of the OTA master 31. Although not shown in the figure, various kinds of programs and data for implementation of the OTA service may be also stored in the storage unit 47.

The update control program 151 is a program for the OTA master 31 to perform the processes according to the present embodiment.

The installed SWID definition data 152 is data on the SWID installed in the vehicle (the function corresponding to the SWID installed in the vehicle). FIG. 10 shows an example of the data configuration of the installed SWID definition data 152. The installed SWID definition data 152 is a database including at least the following items: SWID 161 and configuration information 162. Since the basic data configuration of the installed SWID definition data 152 is similar to that of the SWID database 102, detailed description thereof will be omitted, but the installed SWID definition data 152 shows only data related to the SWID currently installed in the vehicle, as extracted from the data included in the SWID database 102. The content of the installed SWID definition data 152 may be updated when the update process is performed. For example, when "autonomous driving function Ver 1.0" is updated to "autonomous driving function Ver 2.0" as a result of the update process by the OTA service, the content of the installed SW ID definition data 152 is also updated according to this update.

Referring back to FIG. 9, the check SWID hash value 153 is data to be used to determine whether a change other than a change due to the update process related to the OTA service has occurred in the software configuration of the vehicle. In the present embodiment, it is assumed that an ECU is physically replaced in a maintenance shop. It is therefore assumed that the check SWID hash value 153 is generated by, for example, a maintenance worker performing a predetermined operation before the replacement work. Specifically, the SWID hash value for each SWID (installed in the vehicle) at that time is calculated based on the predetermined operation. It is assumed that the check SWID hash value 153 is generated by storing the calculated SWID hash values in the storage unit 47. FIG. 11 shows an example of the data configuration of the check SWID hash value 153. The check SWID hash value 153 is data in a table format including the following items: SWID 171 and check hash value 172. The item of the SWID 171 is data indicating the SWID installed on the vehicle. The item of the check hash value 172 is data storing the SWID hash values before replacement work.

Processing Flow in First Embodiment

Figure 12:
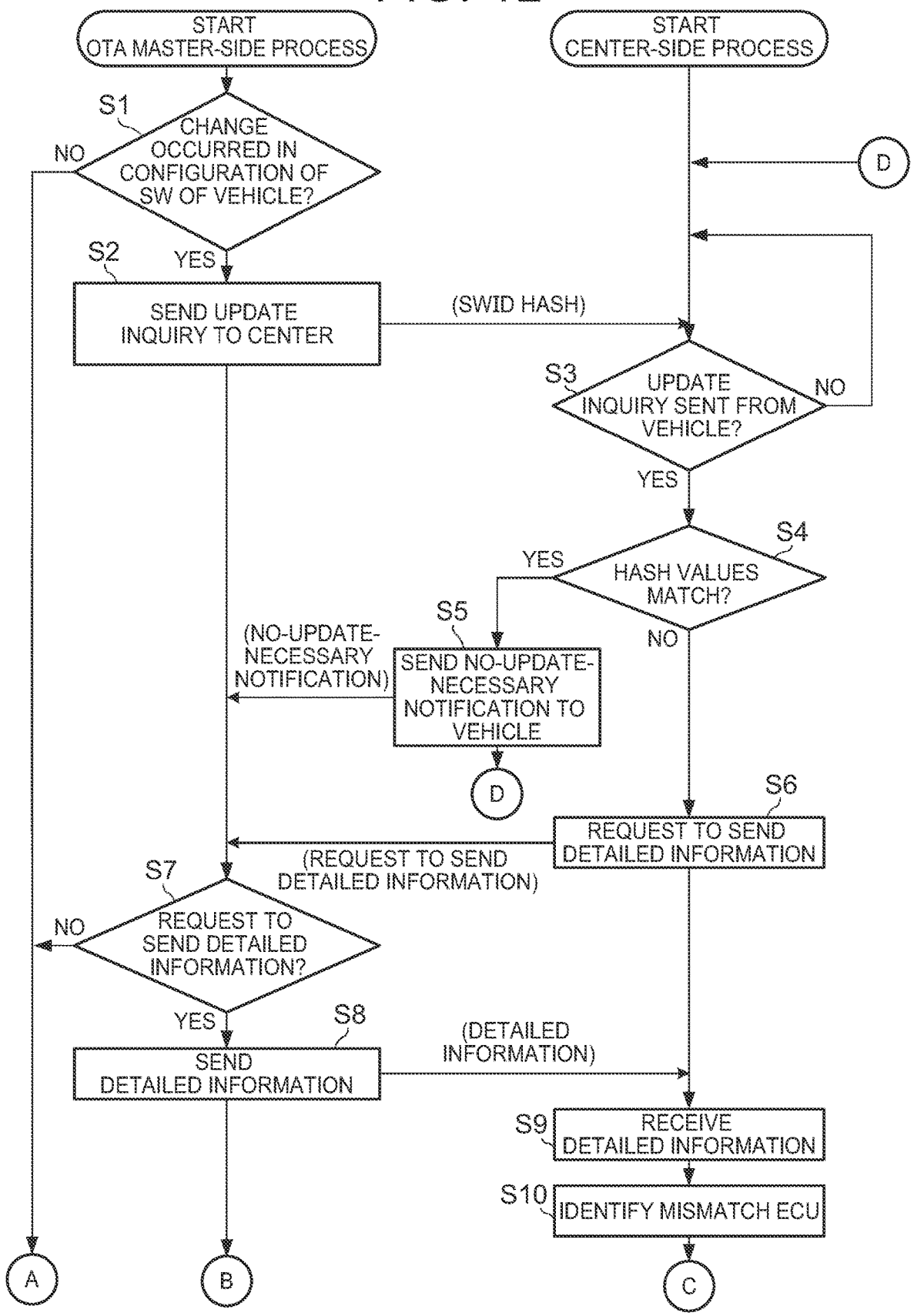
FIG. 12 is a flowchart illustrating details of a process according to a first embodiment.
Figure 13:
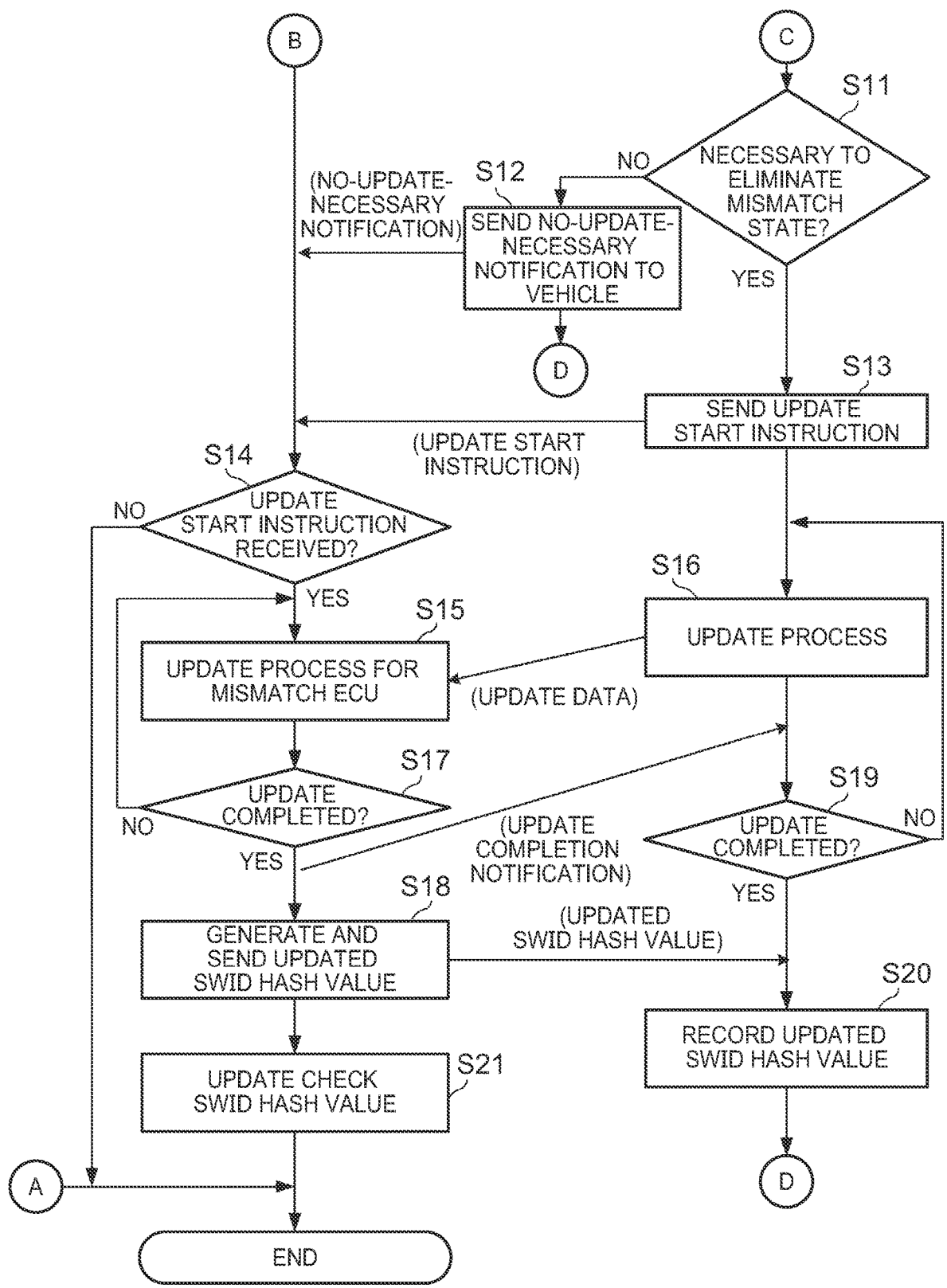
FIG. 13 is a flowchart illustrating details of the process according to the first embodiment.

Next, the processing flow in the first embodiment will be described. FIGS. 12 and 13 are flowcharts illustrating the details of the update control process according to the first embodiment. In FIGS. 12 and 13, a process that is performed by the OTA master 31 is shown on the left side of the figure, and a process that is performed by the center 1 is shown on the right side of the figure. In the present embodiment, it is assumed that the process on the OTA master 31 side is started when the ignition of the vehicle is turned on. In the following description, it is assumed that the check SWID hash value 153 has already been generated by a maintenance worker as described above.

First, in step S1, the control unit 49 of the OTA master 31 determines whether a change has occurred in the software configuration of ECU software installed in the vehicle. That is, the control unit 49 of the OTA master 31 determines whether there is any SWID that is in the mismatch state. Although this determination may be made by any method, a method in which the SWID hash values before and after the ECU replacement work are compared is illustrated in the present embodiment. Specifically, prior to such ECU replacement work, SWID hash values for all the SWIDs installed in the vehicle are stored based on the operation of the maintenance worker. The control unit 49 then checks, for each SWID, whether the SWID hash value after the replacement matches the stored SWID hash value. The control unit 49 thus determines whether a change has occurred in the software configuration. That is, the control unit 49 calculates the SWID hash value of each SWID and compares the calculated SWID hash value of each SWID with the content of the check SWID hash value 153. When there is a mismatch between the SWID hash values of any SWID, the control unit 49 determines that a change has occurred in the software configuration of that SWID. When there is no mismatch between the SWID hash values, the control unit 49 determines no change has occurred in the software configuration. The control unit 49 is an example of a "configuration information acquire unit".

Regarding step S1, in the first embodiment, the SWID hash values of all the SWIDs installed in the vehicle are stored, and the control unit 49 checks all the SWIDs to detect an SWID whose configuration has changed. In another embodiment, step S1 may be performed as follows. For example, it is considered that the ECU to be replaced can be determined in advance in a maintenance shop. Therefore, before the replacement work is started, only the data indicating the SWID whose constituent ECU is the ECU to be replaced and the SWID hash value of that SWID may be stored as the check SWID hash value 153. In step S1, the control unit 49 may perform the above comparison process only for the SWID of the ECU to be replaced. This can speed up the processing.

When the control unit 49 determines in step S1 that no change has occurred in the software configuration (NO in step S1), the update control process on the vehicle side (OTA master side) ends. On the other hand, the control unit 49 determines in step S1 that a change has occurred in the software configuration (YES in step S1), the routine proceeds to step S2. In step S2, the control unit 49 calculates the SWID hash value of the SWID whose software configuration has changed. The control unit 49 then generates an "update inquiry" and sends it to the center 1. The "update inquiry" is data for inquiring about whether there is an update. At this time, the control unit 49 includes the VIN indicating the vehicle, the SWID whose software configuration has changed, and the calculated SWID hash value in the "update inquiry" and sends the "update inquiry" to the center 1.

Next, in step S3, the control unit 18 of the center 1 determines whether the "update inquiry" including the SWID hash value has been sent from a predetermined vehicle. When the "update inquiry" has not been sent from a predetermined vehicle (NO in step S3), the control unit 18 repeats step S3 (that is, waits for an "update inquiry"). When the "update inquiry" has been sent from the predetermined vehicle (YES in step S3), the routine proceeds to step S4. In step S4, the control unit 18 receives the "update inquiry" and performs a check process based on the SWID hash value included in the "update inquiry." Specifically, the control unit 18 refers to the vehicle database 103 and identifies the vehicle (OTA master 31) that sent the "update inquiry." The control unit 18 also acquires the previous hash value 124 corresponding to the SWID included in the "update inquiry" from the vehicle database 103. The control unit 18 then determines whether the previous hash value 124 matches the SWID hash value included in the "update inquiry." When the control unit 18 determines that the hash values match (YES in step S4), the control unit 18 sends a no-update-necessary notification to the OTA master 31 in step S5. The no-update-necessary notification is a notification indicating that the update process is not necessary. The routine then returns to step S3 (the control unit 18 waits for an "update inquiry").

On the other hand, when the control unit 18 determines that the hash values do not match (NO in step S4), the routine proceeds to step S6. In step S6, the control unit 18 sends to the OTA master 31, a request to send detailed information on that SWID. The detailed information refers to information indicating the specific software versions of the constituent ECUs of the SWID (rather than the SWID hash value). After sending the request, the control unit 18 waits for a response from the OTA master 31.

Next, in step S7, the control unit 49 of the OTA master 31 determines whether there is a request to send detailed information. Specifically, the control unit 49 determines whether a no-update-necessary notification has been sent to the OTA master 31 or a request to send detailed information has been sent to the OTA master 31. When a no-update-necessary notification has been sent to the OTA master 31 (NO in step S7), the control unit 49 assumes that detailed information is not requested, and ends the update control process on the vehicle side. On the other hand, when a request to send detailed information has been sent to the OTA master 31 (YES in step S7), the routine proceeds to step S8. In step S8, the control unit 49 generates detailed information and sends it to the center 1. Specifically, the control unit 49 acquires information on the software versions of the constituent ECUs of the SWID specified in the request. The control unit 49 then generates detailed information including the information on the software versions and sends the detailed information to the center 1. Thereafter, the control unit 49 waits for a notification or an instruction from the center 1.

Subsequently, in step S9, the control unit 18 of the center 1 receives the detailed information sent from the control unit 49. In step S10, the control unit 18 then identifies the ECU software whose version does not match, based on the detailed information. Specifically, the control unit 18 compares the version of each constituent ECU shown in the detailed information with the Ver information 114 defined in the SWID database 102 to identify the constituent ECU whose version does not match. Hereinafter, this constituent ECU whose the version does not match is referred to as the "mismatch ECU."

Thereafter, in step S11 of FIG. 13, the control unit 18 determines whether it is necessary to eliminate the mismatch state by performing the update process for the mismatch ECU. This determination is made in consideration of the fact that, the mismatch state should be eliminated in principle, but depending on the software version, there may be cases where there will be no functional problem even if the mismatch state remains. For example, when the version of the accelerator ECU is upgraded from 2.0 to 2.1, the change involved in the upgrade may be a change that does not affect implementation of the autonomous driving function. In this case, the control unit 18 may determine that an update is not necessary, even when the version of the accelerator ECU does not match the content of the Ver information 114 defined in the SWID database 102. This makes it possible to avoid performing the update process that need not necessarily be performed, and the amount of communication can be reduced. Information on such a version that is allowed even in the mismatch state is not shown in the figures. The data indicating the information on such a version that is allowed even in the mismatch state may be stored in the storage unit 16 of the center 1. In this case, the control unit 18 may determine the necessity of the update process, based on this information.

When the control unit 18 determines in step S11 that it is not necessary to eliminate the mismatch state (NO in step S11), the routine proceeds to step S12. In step S12, the control unit 18 sends a "no-update-necessary notification" to the OTA master 31. The routine then returns to step S3.

On the other hand, when the control unit 18 determines in step S11 that it is necessary to eliminate the mismatch state (YES in step S11), the update process is performed. Specifically, the control unit 18 first sends an update start instruction to the OTA master 31 in step S13. The control unit 49 of the OTA master 31 then determines in step S14 whether an update start instruction has been received. When the control unit 49 determines in step S14 that a no-update-necessary notification (rather than an update start instruction) has been received (NO in step S14), the control unit 49 ends the update control process on the OTA master 31 side. On the other hand, when the control unit 49 determines in step S14 that an update start instruction has been received (YES in step S14), the control unit 18 of the center 1 and the control unit 49 of the OTA master 31 cooperate with each other as appropriate to perform the update process for the mismatch ECU in steps S15 and S16. Specifically, the control unit 18 of the center 1 sends update data to the OTA master 31. The control unit 49 of the OTA master 31 performs a process of updating the software on the mismatch ECU based on the update data.

In step S17, the control unit 49 then determines whether the update process is completed. When the update process is not completed yet (NO in step S17), the routine returns to step S15, and the control unit 49 continues the update process. When the update process is completed (YES in step S17), the control unit 49 sends an update completion notification to the center 1. In step S18, the control unit 49 also generates an updated SWID hash value. The control unit 49 sends the generated SWID hash value to the center 1.

The control unit 18 of the center 1 determines in step S19 whether the control unit 18 has received an update completion notification from the OTA master 31. When the control unit 18 has not received an update completion notification, the routine returns to step S16, and the control unit 18 continues the update process. When the control unit 18 receives an update completion notification, the routine proceeds to step S20. In step S20, the control unit 18 receives the updated SWID hash value sent from the OTA master 31 and records it as the previous hash value 124 in the vehicle database 103. The routine then returns to step S3, and the control unit 18 repeats the process.

In step S21, the control unit 49 of the OTA master 31 then updates the content of the check SWID hash value 153 with the content of the updated SWID hash value. Accordingly, next time the control unit 49 performs step S1, the control unit 49 determines that no change has occurred in the software configuration. This means that the mismatch state in the software configuration has been eliminated. The update control process according to the first embodiment ends in this manner.

As described above, in the first embodiment, when a change occurs in the software configuration of an ECU due to replacement of the ECU, only the information on the ECU of the SWID in which the change has occurred is sent to the center 1, and the update process is performed. Accordingly, the amount of communication can be reduced as compared to the case of using the total hash value, and the time required to complete the update process can be reduced.

Second Embodiment

Next, a second embodiment of such a process using an SWID as described above will be described. The following case will be considered in the second embodiment. In the second embodiment, it is assumed that an emergency update is to be performed on a predetermined ECU. In the OTA service, the OTA master 31 usually periodically, such as every two weeks, makes an inquiry to the center 1 about whether there is an update. When the center 1 determines that there is an update in response to the inquiry about whether there is an update, the update process is performed. However, there may be cases where there is an emergency update. In such cases, the following processing is performed as the second embodiment. First, the center 1 sends a command (hereinafter referred to as the "center command") to cause the OTA master 31 to make an "update inquiry" to the center 1 to the OTA master 31 through a path different from the network used for the OTA service (Internet network), such as Short Message Service (SMS) or Vehicle-to-everything (V2X) of a carrier network. In the present embodiment, it is assumed that the center 1 sends the center command through the SMS. The center command includes information indicating the SWID whose constituent ECU is the ECU to be subjected to an emergency update. On the vehicle side (OTA master 31 side), when the control unit 49 receives the center command, the control unit 49 sends the SWID hash value of the SWID indicated by the center command to the center 1 next time the ignition is turned on. The control unit 18 of the center 1 determines the necessity of the update process for the vehicle, based on the received SWID hash value. When necessary, the process for the emergency update is performed. The control unit 49 is an example of a "center command receiving unit".

Hereinafter, the second embodiment will be described in detail. Since the hardware configuration (center 1 and OTA master 31) in the second embodiment is basically similar to that in the first embodiment, detailed description thereof will be omitted. In the second embodiment, the communication module 32 of the vehicle 3 also functions as a center command receiving unit for receiving the center command.

Figure 14:
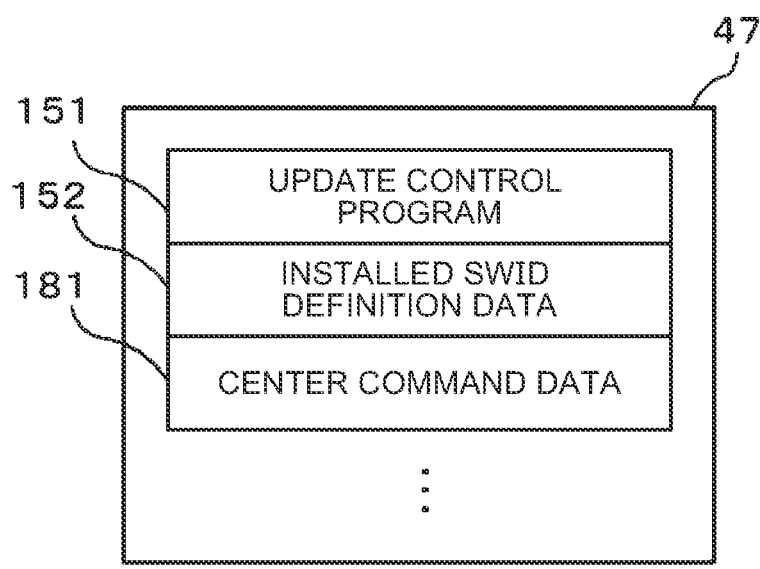
FIG. 14 illustrates a memory map showing an example of data stored in the storage unit 47 of the OTA master 31 in a second embodiment.

Data that is used in the second embodiment is basically similar to that in the first embodiment. However, apart of the data that is stored in the storage unit 47 of the OTA master 31 is different between the first and second embodiments. FIG. 14 illustrates a memory map showing an example of data stored in the storage unit 47 of the OTA master 31 in the second embodiment. At least an update control program 151, installed SWID definition data 152, and center command data 181 are stored in the storage unit 47 of the OTA master 31. Since the update control program 151 and the installed SWID definition data 152 are similar to those in the first embodiment, description thereof will be omitted.

The center command data 181 stores the center command received by the communication module 32. In the present embodiment, whether there is the center command is determined when the ignition is turned on. When there is the center command, processing based on the content of the center command data 181 is performed. In the present embodiment, it is assumed that the center command defines a command to perform such an emergency update as described above, specifically an instruction to send the SWID to be subjected to the emergency update to the center 1.

Figure 15:
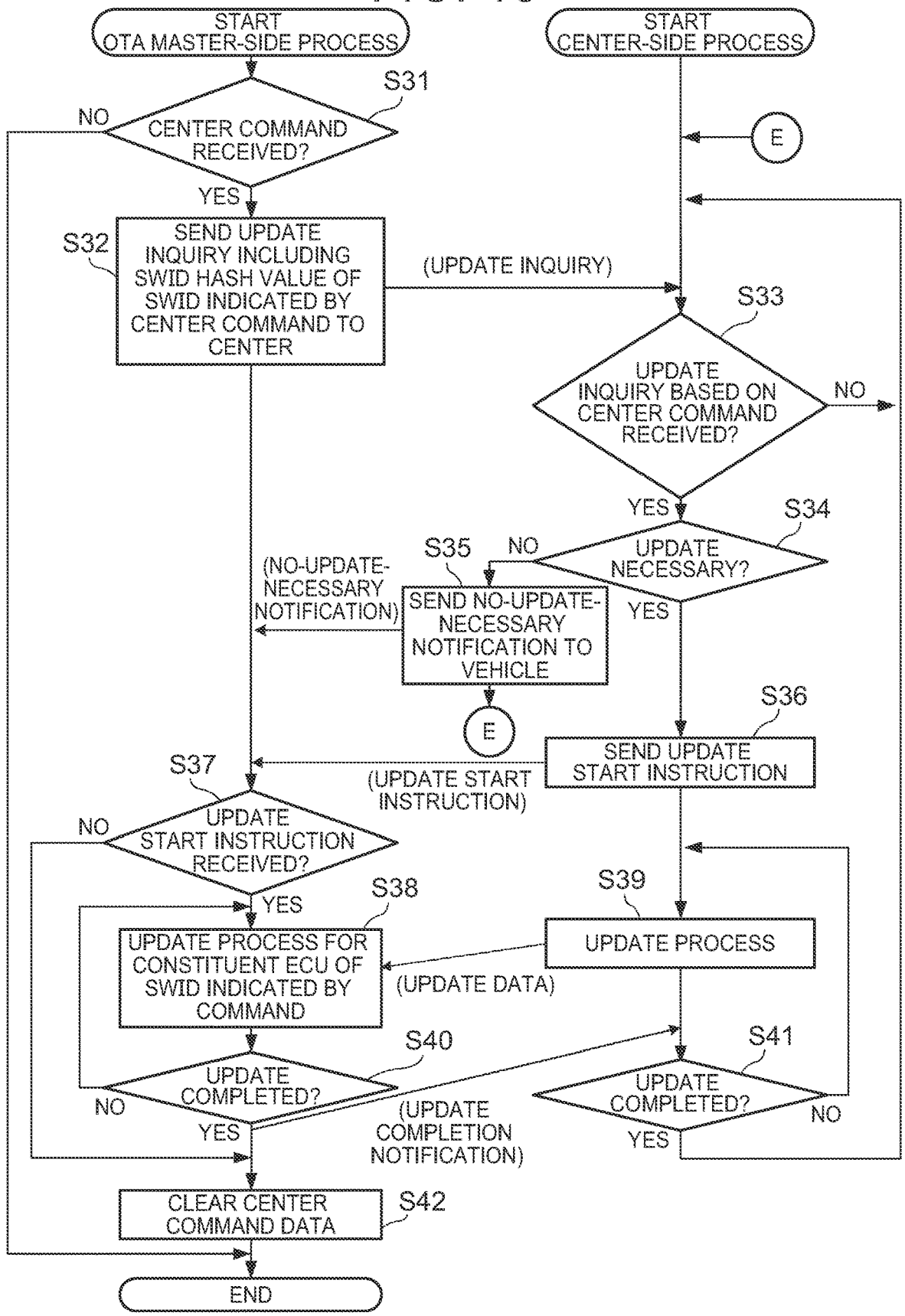
FIG. 15 is a flowchart illustrating details of a process according to the second embodiment.

Next, the processing flow in the second embodiment will be described. FIG. 15 is a flowchart illustrating the details of the update control process according to the second embodiment. In FIG. 15, a process that is performed by the OTA master 31 is shown on the left side of the figure, and a process that is performed by the center 1 is shown on the right side of the figure. In the present embodiment, it is assumed that the process on the OTA master 31 side is started when the ignition of the vehicle is turned on. It is also assumed that the center command has already been sent from the center 1 through the SMS and is stored in the center command data 181.

First, the control unit 49 of the OTA master 31 determines in step S31 whether a center command has been received. Specifically, the control unit 49 refers to the center command data 181. When the center command is stored in the center command data 181, the control unit 49 determines that a center command has been received. When the center command is not stored in the center command data 181, the control unit 49 determines that no center command has been received. When the control unit 49 determines that no center command has been received (NO in step S31), the control unit 49 ends the update control process according to the second embodiment. On the other hand, when the control unit 49 determines that a center command has been received (YES in step S31), the routine proceeds to step S32. In step S32, the control unit 49 calculates the SWID hash value of the SWID indicated by the center command. The control unit 49 then generates an "update inquiry" including information on the SWID and the SWID hash value, and sends the "update inquiry" to the center 1.

Thereafter, the control unit 18 of the center 1 determines in step S33 whether an "update inquiry" based on the center command has been received from a predetermined vehicle. For example, data indicating that this update inquiry is an "update inquiry" based on the center command is included in the header of the "update inquiry," and the control unit 18 may determine based on this data whether the update inquiry is the "update inquiry" based on the center command. When the control unit 18 determines that no "update inquiry" based on the center command has been received (NO in step S33), step S33 is repeated. That is, the control unit 18 continues to wait for the "update inquiry" based on the center command.

On the other hand, when the control unit 18 determines that an "update inquiry" based on the center command has been received (YES in step S33), the routine proceeds to step S34. In step S34, the control unit 18 determines whether the update process is necessary, based on the SWID hash value included in the received "update inquiry." Specifically, the control unit 18 determines whether the SWID hash value included in the "update inquiry" matches the SWID hash value of the SWID to be subjected to the emergency update this time. When these SWID hash values match, the control unit 18 determines that the update is not necessary. When these SWID hash values do not match, the control unit 18 determines that the update is necessary. For example, such an emergency update is not necessary when an update process similar to this emergency update has already been performed in a maintenance shop before the center command for the emergency update is received.

When the control unit 18 determines in step S34 that the update is not necessary (NO in step S34), the control unit 18 sends a no-update-necessary notification to the OTA master 31 in step S35. On the other hand, when the control unit 18 determines in step S34 that the update is necessary (YES in step S34), the control unit 18 sends an update start instruction to the OTA master 31 in step S36. Thereafter, the control unit 49 of the OTA master 31 determines in step S37 whether an update start instruction has been received. When the control unit 49 determines in step S37 that a no-update-necessary notification (rather than an update start instruction) has been received (NO in step S37), the control unit 49 ends the update control process. On the other hand, when the control unit 49 determines in step S37 that an update start instruction has been received (YES in step S37), the control unit 18 of the center 1 and the control unit 49 of the OTA master 31 cooperate with each other as appropriate to perform the update process in steps S38 and S39. Specifically, the control unit 49 sends such detailed information as described in the first embodiment to the center 1. The control unit 18 of the center 1 identifies the ECU software that needs to be updated, and sends update data to the OTA master 31. The control unit 49 of the OTA master 31 then performs a process of updating the ECU software to be subjected to the emergency update, based on the update data.

In step S40, the control unit 49 then determines whether the update process is completed. When the update process is not completed yet (NO in step S40), the routine returns to step S38, and the control unit 49 continues the update process. When the update process is completed (YES in step S40), the control unit 49 sends an update completion notification to the center 1.

The control unit 18 of the center 1 determines in step S41 whether the control unit 18 has received an update completion notification. When the control unit 18 has not received an update completion notification (NO in step S41), the routine returns to step S39, and the control unit 18 continues the update process. When the control unit 18 has received an update completion notification (YES in step S41), the routine returns to step S33, and the control unit 18 repeats the process.

Thereafter, in step S42, the control unit 49 of the OTA master 31 clears the center command data 181. As a result, the control unit 49 determines in step S31 that no center command has been received, unless a new center command is received.

The update control process according to the second embodiment ends in this manner.

As described above, in the second embodiment, when there is an emergency update, the ECU to be updated can be determined in advance. Therefore, the center command includes an instruction to send only the SWID of the ECU to be updated. Accordingly, the necessity of the update can be determined for each SWID related to the ECU to be updated, without performing processing for all the ECUs. The processing related to the emergency update can thus be completed more quickly.

Third Embodiment

Next, a third embodiment will be described. The third embodiment illustrates the combined process of the first embodiment and second embodiment. Specifically, when a change has occurred in the software configuration upon reception of the center command, the control unit 49 also sends the SWID hash value of the SWID corresponding to the change in software configuration. Then, the mismatch state is eliminated before execution of the process according to the center command is started. In other words, in response to the center command, the control unit 49 sends the SWID whose software configuration has changed to the center 1 and, if necessary, eliminates the mismatch state.

Figure 16:
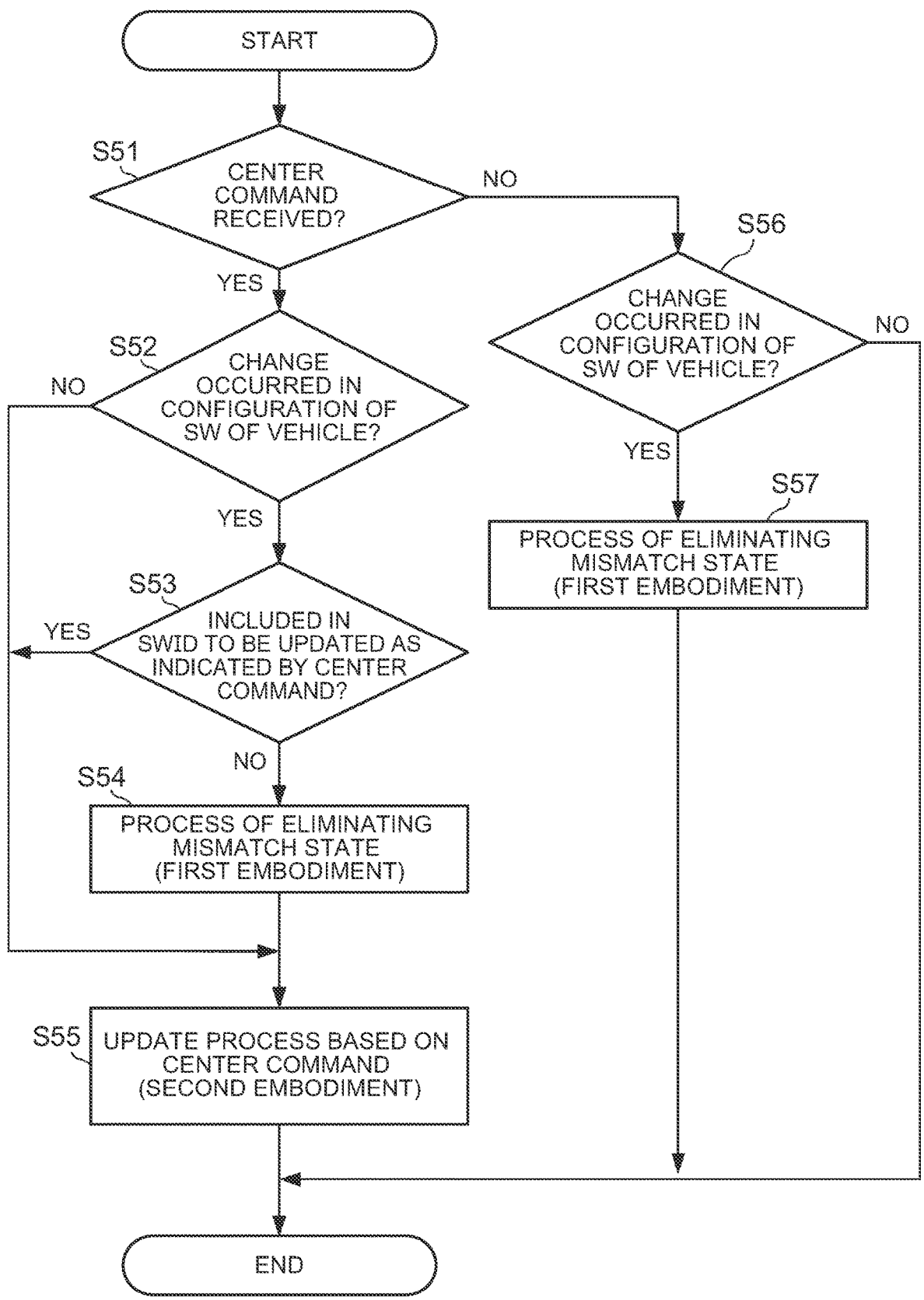
FIG. 16 is a flowchart illustrating details of a process according to a third embodiment.

FIG. 16 is a flowchart illustrating the processing flow according to the third embodiment. FIG. 16 shows only the process that is performed by the OTA master 31. In FIG. 16, the control unit 49 first determines in step S51 whether a center command has been received. This step is similar to step S31. When the control unit 49 determines in step S51 that a center command has been received (YES in step S51), the routine proceeds to step S52. The control unit 49 then determines in step S52 whether a change has occurred in the software configuration of ECU software installed in the vehicle. This step is similar to step S1 shown in FIG. 12. When the control unit 49 determines in step S52 that no change has occurred in the software configuration (NO in step S52), the routine proceeds to step S55 that will be described later.

On the other hand, when the control unit 49 determines in step S52 that a change has occurred in the software configuration (YES in step S52), the routine proceeds to step S53. In step S53, the control unit 49 determines whether the SWID whose software configuration has changed (the ECU software corresponding to the SWID whose software configuration has changed) is included in the SWID to be updated as indicated by the center command. When the control unit 49 determines in step S53 that the SWID whose software configuration has changed is included in the SWID to be updated as indicated by the center command, the control unit 49 performs an update process based on the center command. On the other hand, when the control unit 49 determines in step S53 that the SWID whose software configuration has changed is not included in the SWID to be updated as indicated by the center command, the control unit 49 performs a separate control to perform a process of eliminating the mismatch state. Specifically, when the SWID whose software configuration has changed is not included in the SWID to be updated as indicated by the center command (NO in step S53), the routine proceeds to step S54. In step S54, the control unit 49 performs the process of eliminating the mismatch state. That is, the control unit 49 eliminates the mismatch state by performing such a process as described in the first embodiment. The routine then proceeds to step S55.

On the other hand, when the control unit 49 determines in step S53 that the SWID whose software configuration has changed is included in the SWID to be updated as indicated by the center command (YES in step S53), the routine proceeds to step S55. In step S55, the control unit 49 performs the update process based on the center command. That is, the control unit 49 performs such a process as described above in the second embodiment to update the ECU software to be updated as indicated by the center command. The control unit 49 then ends the update control process according to the third embodiment.

On the other hand, when the control unit 49 determines in step S51 that no center command has been received (NO in step S51), the routine proceeds to step S56. The control unit 49 then determines in step S56 whether a change has occurred in the software configuration of ECU software installed in the vehicle. This step is similar to step S31. When the control unit 49 determines in step S56 that a change has occurred in the software configuration (YES in step S56), the control unit 49 performs the process of eliminating the mismatch state in step S57. That is, as in step S54, the control unit 49 eliminates the mismatch state by performing such a process as described in the first embodiment.

On the other hand, when the control unit 49 determines in step S56 that no change has occurred in the software configuration (NO in step S56), the control unit 49 ends the update control process according to the third embodiment.

As described above, in the third embodiment, when a change has occurred in the software configuration upon reception of the center command, information on the SWID in which the change has occurred is sent to the center 1. Therefore, the process of eliminating the mismatch state can also be performed when the process based on the center command is performed. This makes it possible to avoid performing the processes separately. Moreover, the mismatch state can be quickly eliminated.

Modifications

An example in which a center command is sent through the SMS etc. in the case of an emergency update is illustrated in the second embodiment. However, the present disclosure is not limited to this, and a center command other than a center command to address an emergency update may be sent. For example, a center command including an instruction to send only the information on the SWID whose software configuration has changed to the center 1 may be sent in another embodiment. In this case, the control unit 49 of the OTA master 31 may calculate the SWID hash value of the SWID whose software configuration has changed and send the calculated SWID hash value to the center 1, according to the instruction of the center command. That is, the center command may be sent in order to start such a process of eliminating the mismatch state as illustrated in the first embodiment.

Regarding the center command, such a center command to send only the information on the SWID whose software configuration has changed to the center 1 as described above may also be sent in the following case. For example, it is herein assumed that a change has occurred in the software configuration of a predetermined SWID due to replacement of an ECU on the vehicle, and the OTA master 31 is not aware of this change for some reason, but the center 1 is aware of this change. For example, the center 1 can be aware of such a change when information on the content of ECU replacement work is sent from a maintenance shop to the center 1 upon completion of the ECU replacement work. In such a case, the center 1 can identify the SWID in which the change has occurred (or may have occurred) for the vehicle for which the ECU replacement work was performed. Therefore, in order to perform such a process as illustrated in the first embodiment in this case, a center command including an instruction to send information on the SWID corresponding to the replaced ECU to the center 1 may be sent to the OTA master 31.

In the first embodiment, when a change occurs in the software configuration, the SWID hash value according to this change is sent to the center 1. In the second and third embodiments, a predetermined SWID hash value is sent to the center 1 in response to the center command. In another embodiment, the following process may be performed to send such a SWID hash value. That is, the SWID hash value may be sent to the center 1 upon reception of an inquiry for a normal update process in the OTA service. In the update process in the OTA service, the OTA master 31 periodically, such as every two weeks, makes an inquiry to the center 1 about whether there is an update. When making this inquiry, the total hash value is sent. When it is determined that the total hash values do not match, version information of all the pieces of ECU software is requested. Instead of such a total hash value, the SWID hash values of the SWIDs installed in a predetermined vehicle may be sent to the center 1. The center 1 may perform a check process for each SWID and request the detailed information only for the SWID that needs to be updated. In this case as well, the time required to complete the update process can be reduced.

Although embodiments of the technique of the present disclosure are described above, the present disclosure can be interpreted not only as an OTA master but also as an update control method that is performed by a computer of an OTA master including at least a processor and a memory and configured to communicate with an OTA center over a network, a control program of the update control method, a computer-readable non-transitory storage medium storing the control program, etc. The OTA master may include one or more processors.

The technique of the present disclosure can be used for an OTA master that controls a software update function.

What is claimed is:

1. An OTA master configured to update one or more software on in-vehicle device, the OTA master being configured to connect to an in-vehicle network including the in-vehicle device and communicate with an OTA center over a network, the OTA master comprising one or more processors configured to:

determine whether a change has occurred in a configuration of a combination of the software on the in-vehicle device before and after a predetermined timing;

when the change has occurred, out of software groups each composed of the combination of the software, acquire configuration information on the software group in which the change has occurred; and send the acquired configuration information to the OTA center.

2. The OTA master according to claim 1, wherein the one or more processors are configured to:
   receive, from the OTA center, a center command including a command to send configuration information on a predetermined software group; and
   acquire, when the one or more processors received the center command, the configuration information on the software group in which the change has occurred in the configuration of the combination of the software.

3. The OTA master according to claim 2, wherein the center command includes a command to send the configuration information on the software group in which the change has occurred in the configuration of the combination of the software.

4. An update control method that is performed by a computer of an OTA master that is configured to update one or more software on in-vehicle device, connect to an in-vehicle network including the in-vehicle device, and communicate with an OTA center over a network, the OTA master including one or more processors and a memory, the update control method comprising:
   determining whether a change has occurred in a configuration of a combination of the software of the in-vehicle device before and after a predetermined timing;
   when the change has occurred, out of software groups each composed of the combination of the software, acquiring configuration information on the software group in which the change has occurred; and
   sending the acquired configuration information to the OTA center.

5. A non-transitory storage medium storing instructions that are executable by one or more computers of an OTA master and that cause the one or more computers to perform functions, the OTA master including one or more processors and a memory, and the OTA master being configured to update one or more software on in-vehicle device, connect to an in-vehicle network including the in-vehicle device, and communicate with an OTA center over a network, the functions comprising:
   determining whether a change has occurred in a configuration of a combination of the software on the in-vehicle device before and after a predetermined timing;
   when the change has occurred, out of software groups each composed of the combination of the software, acquiring configuration information on the software group in which the change has occurred; and
   sending the acquired configuration information to the OTA center.

* * * * *